US010885512B2

(12) United States Patent
Carlson

(10) Patent No.: US 10,885,512 B2
(45) Date of Patent: Jan. 5, 2021

(54) METHODS AND SYSTEMS FOR ENHANCED BLUETOOTH® BONDING

(71) Applicant: Roche Diabetes Care, Inc., Indianapolis, IN (US)

(72) Inventor: Craig L. Carlson, Fishers, IN (US)

(73) Assignee: Roche Diabetes Care, Inc., Indianapolis, IN (US)

(*) Notice: Subject to any disclaimer, the term of this patent is extended or adjusted under 35 U.S.C. 154(b) by 54 days.

(21) Appl. No.: 16/324,150

(22) PCT Filed: Aug. 16, 2017

(86) PCT No.: PCT/US2017/047143
§ 371 (c)(1),
(2) Date: Feb. 8, 2019

(87) PCT Pub. No.: WO2018/035223
PCT Pub. Date: Feb. 22, 2018

(65) Prior Publication Data
US 2019/0182662 A1  Jun. 13, 2019

Related U.S. Application Data

(60) Provisional application No. 62/377,066, filed on Aug. 19, 2016.

(51) Int. Cl.
*H04W 4/00* (2018.01)
*G06Q 20/32* (2012.01)
(Continued)

(52) U.S. Cl.
CPC .......... *G06Q 20/3278* (2013.01); *H04W 4/80* (2018.02); *H04W 8/005* (2013.01);
(Continued)

(58) Field of Classification Search
None
See application file for complete search history.

(56) References Cited

U.S. PATENT DOCUMENTS

| 2002/0174364 A1 | 11/2002 | Nordman et al. | |
| 2009/0061775 A1* | 3/2009 | Warren | H04M 1/6091 455/41.2 |
| 2009/0197593 A1* | 8/2009 | Farrell | H04W 4/12 455/426.1 |

(Continued)

FOREIGN PATENT DOCUMENTS

| EP | 1871135 A2 | 12/2007 |
| WO | 2002043325 A2 | 5/2002 |

*Primary Examiner* — Elisabeth Benoit Magloire
(74) *Attorney, Agent, or Firm* — Stinson Leonard Street LLP

(57) ABSTRACT

A BLUETOOTH® enabled computing device is configured to use a "pseudo" device identifier to prevent undesired device interference during BLUETOOTH® pairing. The computing device includes a processor configured to a) retrieve a first BLUETOOTH® device identifier used for identifying the computing device, b) convert the first BLUETOOTH® device identifier into a second BLUETOOTH® device identifier, c) advertise availability of the computing device using the second BLUETOOTH® device identifier, d) receive a pairing request from a second computing device, e) establish a BLUETOOTH® communications path between the computing device and the second computing device, wherein the BLUETOOTH® communications path is created based at least partially on the second BLUETOOTH® device identifier, f) provide the first BLUETOOTH® device identifier as a substitute for the second BLUETOOTH® device identifier, and g) update the BLUETOOTH® communications path between the computing device and the second computing device based on the first BLUETOOTH® device identifier.

21 Claims, 5 Drawing Sheets

(51) Int. Cl.
*H04W 4/80* (2018.01)
*H04W 12/06* (2009.01)
*H04W 12/00* (2009.01)
*H04W 76/14* (2018.01)
*H04W 76/11* (2018.01)
*H04W 8/00* (2009.01)
*H04W 8/26* (2009.01)
*H04W 40/02* (2009.01)
*H04W 40/24* (2009.01)
*H04W 92/18* (2009.01)

(52) U.S. Cl.
CPC ........... *H04W 8/26* (2013.01); *H04W 12/003* (2019.01); *H04W 12/00518* (2019.01); *H04W 12/06* (2013.01); *H04W 40/02* (2013.01); *H04W 40/246* (2013.01); *H04W 76/11* (2018.02); *H04W 76/14* (2018.02); *H04W 92/18* (2013.01)

(56) References Cited

U.S. PATENT DOCUMENTS

| | | | |
|---|---|---|---|
| 2010/0255778 A1 | 10/2010 | Lovell et al. | |
| 2010/0279647 A1* | 11/2010 | Jacobs | H04W 4/90 455/404.1 |
| 2013/0189924 A1* | 7/2013 | Pedro | H04W 4/80 455/41.1 |
| 2015/0189426 A1* | 7/2015 | Pang | H04R 3/00 381/77 |
| 2015/0330796 A1* | 11/2015 | S R | G08B 7/066 701/522 |
| 2015/0356289 A1* | 12/2015 | Brown | G06F 21/44 726/7 |
| 2015/0358778 A1* | 12/2015 | Heo | G01S 19/39 455/456.6 |
| 2016/0050559 A1 | 2/2016 | Rose et al. | |
| 2016/0188969 A1* | 6/2016 | Chung | G06Q 10/10 382/115 |
| 2016/0344592 A1* | 11/2016 | Cook | H04L 43/08 |

\* cited by examiner

METHODS AND SYSTEMS FOR ENHANCED BLUETOOTH® BONDING

CROSS-REFERENCE TO RELATED APPLICATIONS

This application is a national phase application based on PCT/US2017/047143, filed Aug. 16, 2017, which claims priority to U.S. Provisional Application No. 62/377,066 filed on Aug. 19, 2016, which are hereby incorporated by reference in their entireties.

TECHNICAL FIELD

The present invention relates generally to the art of BLUETOOTH® enabled computing systems, and more specifically to a method of using a "pseudo" device address in BLUETOOTH® pairing to reduce interference during the pairing process.

BACKGROUND

BLUETOOTH® wireless technology (BWT) is used to establish wireless connectivity between computing devices. (BLUETOOTH® is a registered trademark of BLUETOOTH® SIG, Inc., Kirkland, Wash.) BLUETOOTH® enables such devices to connect and communicate with one another efficiently.

BWT utilizes the free and globally available 2.4 GHz radio band. This band is also known as the industrial, scientific, and medical (ISM) radio band. Operation in the ISM band allows BWT to utilize low levels of power while allowing BLUETOOTH® enabled devices within an acceptable range to share data. Each BLUETOOTH® enabled device may simultaneously communicate with many other devices in a variety of topologies supported by the BLUETOOTH® protocol. BWT is used with a variety of products including mobile computing devices, stationary computing devices, computing peripheral devices, smart phones, wearable computing devices, medical computing devices, and vehicular computing devices.

In order for two BLUETOOTH® enabled devices to communicate with one another, the devices must be "paired" to one another. Such pairing is crucial to BLUETOOTH® communication because it helps to assure that BLUETOOTH® enabled devices only communicate with known or approved BLUETOOTH® enabled devices. During pairing, the two devices may also 'bond' by storing security keys which allows the devices to reconnect at a later point in time and securely exchange data without unnecessary further user intervention after an initial pairing.

BLUETOOTH® bonding involves causing a given pair of BLUETOOTH® enabled devices to become a trusted pair to one another. To achieve pairing, BLUETOOTH® enabled devices complete a specific device discovery and authentication process. Upon completing the pairing and bonding process, each device can automatically transmit and accept communication between them.

In the device discovery process, each BLUETOOTH® enabled device searches for and locates nearby BLUETOOTH® enabled devices to communicate with. Only BLUETOOTH® enabled devices that are in a "discoverable" mode may be located or "discovered."

A BLUETOOTH® enabled device that is scanning for BLUETOOTH® enabled devices is said to be in the device discovery state. A BLUETOOTH® enabled device that is discoverable is said to be in discoverable mode. Upon discovery, the BLUETOOTH® enabled devices may reveal their advertised names and other relevant information before a connection is established between the devices.

Typically, the list of the discovered devices is presented to the user. The user would then be required to select the desired device to be paired with and confirm that the pairing should take place. Thus, the user may instruct the discovering device to pair and bond the devices. Upon such confirmation, the devices establish a relationship by creating a link key that constitutes a "shared secret". The link key is subsequently used to govern communication between the paired devices unless and until the devices are unpaired. Either device may cause an unpairing by deleting its respective link key.

Once the devices are paired and bonded, they may communicate with one another. Even when the devices lose connectivity (e.g., by moving out of range from one another or losing BLUETOOTH® communications access), they may restore communication without re-pairing unless one or both devices lose their respective link information.

In at least some examples, however, a new BLUETOOTH® enabled device (a first device) may seek to pair with a BLUETOOTH® enabled device (a second device) that previously paired with another BLUETOOTH® enabled device (a third device). In such cases, if the new first device attempts to initiate a pairing with the second device in the presence of the third device, the pairing attempt may be prevented or delayed. This pairing difficulty arises because of a distinction in how previously paired devices behave. As noted, BLUETOOTH® is designed to enable efficient re-connection of previously paired devices. Therefore, the second device and the third device will reconnect when they are in range of one another. At this point, the third device may be able to transmit data to and request data from the second device. While this data exchange occurs, the second and third devices may principally be engaged in data communications that may inhibit further pairing with other devices until such communication ceases.

As a result, in these situations, the first device may be delayed in establishing a pairing with the second device or even completely prevented from establishing a pairing with the second device.

SUMMARY OF THE DISCLOSURE

It is the object of this disclosure to overcome the challenges of pairing BLUETOOTH® enabled devices while in the presence of additional BLUETOOTH® enabled devices that are already paired to one or multiple of the currently pairing devices. The disclosure addresses this difficulty in the following manner.

In one aspect, a method is provided for pairing of BLUETOOTH® enabled devices using a "pseudo" device identifier to prevent undesired device interference. The method is performed by a first computing device. The method includes a) retrieving a first BLUETOOTH® device identifier used for identifying a first computing device at the first computing device, b) converting the first BLUETOOTH® device identifier into a second BLUETOOTH® device identifier, c) advertising availability of the first computing device using the second BLUETOOTH® device identifier, d) receiving a pairing request from a second computing device, e) establishing a BLUETOOTH® communications path between the first computing device and the second computing device, wherein the BLUETOOTH® communications path is created based at least partially on the second BLUETOOTH® device identifier, f) providing the first BLU- ETOOTH® device identifier as a substitute for the second BLUETOOTH® device identifier, and g) updating the BLUETOOTH® communications path between the first computing device and the second computing device based on the first BLUETOOTH® device identifier.

In a further aspect, a system is provided for pairing of BLUETOOTH® enabled devices using a "pseudo" device identifier to prevent undesired device interference. The system includes a first BLUETOOTH® enabled computing device including a first processor, a first memory, and a first transceiver. The system also includes a second BLUETOOTH® enabled computing device including a second processor, a second memory, and a second transceiver. The first processor is configured to a) retrieve a first BLUETOOTH® device identifier used for identifying the first computing device, b) convert the first BLUETOOTH® device identifier into a second BLUETOOTH® device identifier, c) advertise availability of the first computing device using the second BLUETOOTH® device identifier, d) receive a pairing request from the second computing device, e) establish a BLUETOOTH® communications path between the first computing device and the second computing device, wherein the BLUETOOTH® communications path is created based at least partially on the second BLUETOOTH® device identifier, f) provide the first BLUETOOTH® device identifier as a substitute for the second BLUETOOTH® device identifier, and g) update the BLUETOOTH® communications path between the first computing device and the second computing device based on the first BLUETOOTH® device identifier.

In another aspect, a BLUETOOTH® enabled computing device is provided for pairing of BLUETOOTH® enabled devices using a "pseudo" device identifier to prevent undesired device interference. The computing device includes a processor, a memory, and a transceiver. The processor is configured to a) retrieve a first BLUETOOTH® device identifier used for identifying the computing device, b) convert the first BLUETOOTH® device identifier into a second BLUETOOTH® device identifier, c) advertise availability of the computing device using the second BLUETOOTH® device identifier, d) receive a pairing request from a second computing device, e) establish a BLUETOOTH® communications path between the computing device and the second computing device, wherein the BLUETOOTH® communications path is created based at least partially on the second BLUETOOTH® device identifier, f) provide the first BLUETOOTH® device identifier as a substitute for the second BLUETOOTH® device identifier, and g) update the BLUETOOTH® communications path between the computing device and the second computing device based on the first BLUETOOTH® device identifier.

DETAILED DESCRIPTION

Figure 1:
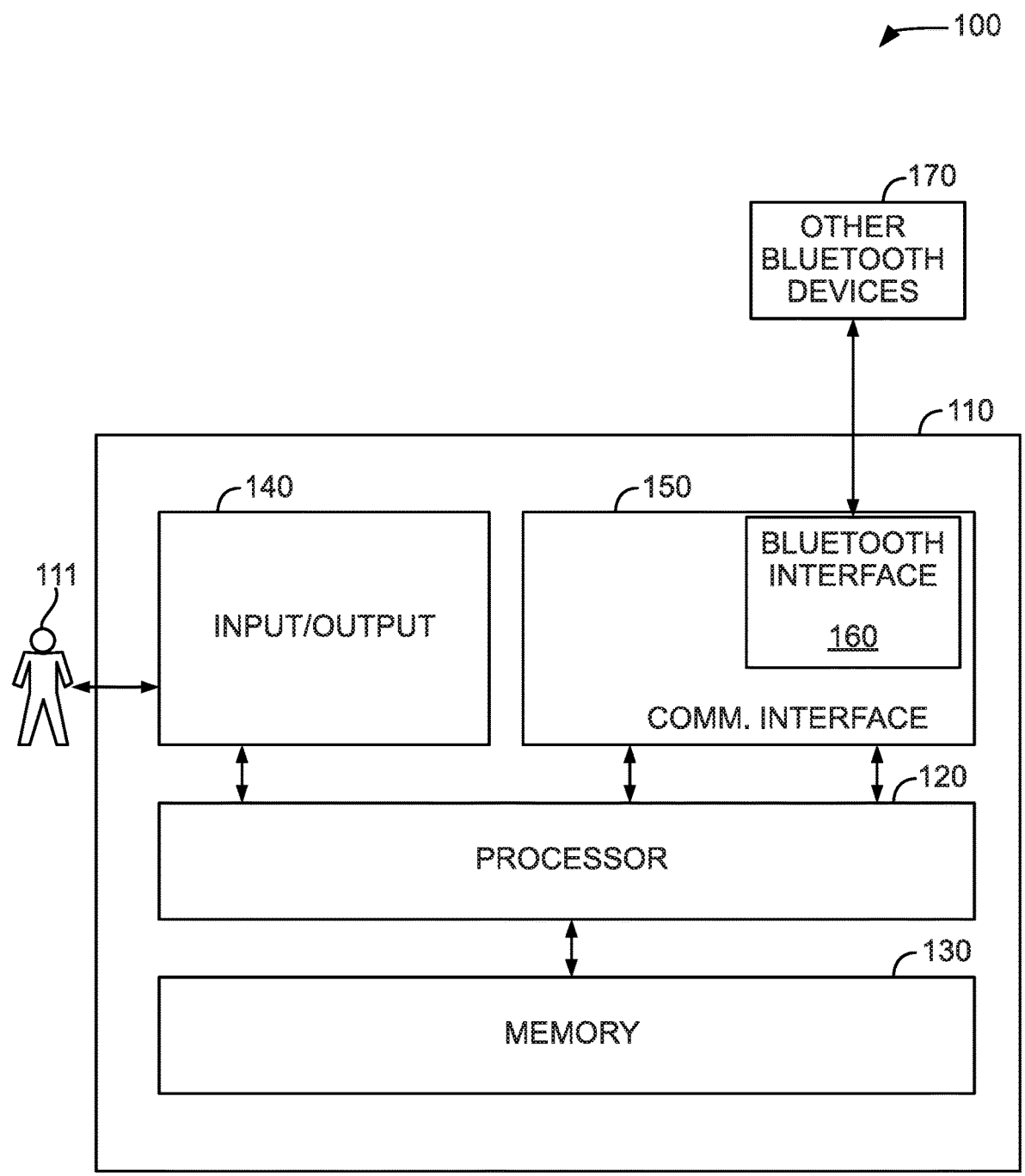
FIG. 1 illustrates an exemplary configuration of a BLUETOOTH® enabled computing device as described herein.

Described herein are methods, a system and an device for enhanced pairing of BLUETOOTH® enabled devices. Specifically, the methods, system, and device use a unique "pseudo" device identifier to prevent undesired device interference during BLUETOOTH® pairing while also reducing undesired pairing attempts. As a result, the methods, system, and device enable the pairing of two BLUETOOTH® enabled devices without the interference of any previously paired BLUETOOTH® enabled device and with a reduction in the use of a pairing device's advertising channel and a reduced risk of message collisions.

Generally, a first BLUETOOTH® enabled device (Device A) may pair with and connect to a second BLUETOOTH® enabled device (Device B) using a first device address. In pairing with Device B, Device A may pair using a first address for Device A. When pairing under BLUETOOTH® protocols, such devices utilize a 48-bit address. This 48-bit address is represented as a 12-digit hexadecimal value. When this device address is classified as a public address, the first 24 bits of the address (i.e., the first six hexadecimal digits) constitute an Organizationally Unique Identifier ("OUI") that is assigned by BLUETOOTH® Registration Authorities. The second 24 bits (i.e., the last six hexadecimal digits) are specific to an individual device within the context of the OUI. However, all 12 hexadecimal digits are used to fully identify any given device.

In general, Device A pairs with Device B using a first Device A address. For example, the first Device A address may be 123456:23:45:67 such that the OUI in this pairing is "123456" and the second part of the address is "23:45:67". (Note that colons are purely syntactical and do not indicate, separately, values of the address.)

Thus, after pairing, Device B "knows" Device A based on the device identifier 123456:23:45:67 in this example. When Device B detects a device with the device identifier 123456:23:45:67, Device B will immediately form a connection to Device A provided that Device A is available for communication and in an acceptable range of communication. At this point, Device B may engage in data communications with Device A.

As described above, if Device C attempts to pair with Device A, the presence of Device B may inhibit such pairing because Device B may enter into a data communications mode with Device A. This may slow or inhibit pairing between Device A and Device C.

Further, attempts for pairing by undesired devices, including Device C, may consume the advertising channel of Device A and create competition for pairing with Device A. Further, such undesired device communication may result in the risk of message collision. The risk of such consumption, competition, and message collision generally increases as the number of undesired devices in communication proximity to Device A increase.

The present disclosure addresses this problem through the use of a "pseudo" (or false) device address. Specifically, at some point after pairing with Device B, Device A re-enters "pairing" mode and broadcasts its availability using connectible advertising packets and a new Device A address. Device A may choose to set or not set the Discoverable Mode bits in the advertising Flags field. Specifically, Device A generates a false, "pseudo" device address to prevent other devices (e.g., Device B in the above example) from detecting that they were previously paired to Device A and reconnecting. The use of the "pseudo" device address prevents such previously paired devices from entering a data communications mode, thereby stopping the resulting interference.

Further, the present disclosure reduces the problems posed by undesired competing devices by using a unique pseudo address specific to each pairing device. More specifically, as described herein, a pairing device advertising its device identifier using the methods described herein (e.g., Device A in the above example) is configured to generate a false, pseudo device address specific to a particular paired device (e.g., Device B in the above example) and use this unique pseudo device address for all communications with that device. Elaborating on this example, Device A may later pair with another device (e.g., Device C) and utilize a second, unique pseudo device address specific to that device (i.e., Device C in this example).

As a result, Device A may allow a user or application to selectively choose (or target) a particular paired device to enable a selective communication channel with a targeted paired device. For example, in the example described above, Device A may, after pairing initially with Devices B and C at least once, selectively switch between the first and second unique pseudo device address. Thus, for a given unique pseudo device address, the targeted device will recognize Device A and reconnect at the exclusion of any other previously paired device. As a byproduct, this method prevents the untargeted devices from consuming the advertising channel of the pairing device (e.g., Device A) with undesired communications and further prevents associated message collisions.

As described herein, the "pseudo" device address may be created in any suitable manner Two example embodiments of "pseudo" device addresses are given below: First, the OUI may be substituted out with a "pseudo" OUI. In this example, the "pseudo" OUI may be stored at a memory located within or in communication with the pairing device (e.g., Device A). (Note that even if a "pseudo" OUI is used, BLUETOOTH® standards require that the false OUI still be registered to the correct organization. Thus, in this case, if Device A used the first method of "pseudo" addressing, its manufacturer would need to register at least two OUIs—one for the proper OUI and one for the "pseudo" OUI.)

In a second example, the second component of the device address may be substituted out for the particular Device A. For example, the characters "23:45:67" in the example listed above may be substituted for a temporary device specific identifier of "13:57:91".

In the above alternatives, the "pseudo" device address is generated at least partially based upon the "real" device address of Device A such that either the first or second portion of the "pseudo" device address corresponds to its counterpart in the real device address. In some alternatives, the "pseudo" address may be wholly distinct from the real device address.

As described herein, a unique "pseudo" device address may be created in any suitable manner. In one example, the advertising device (e.g., Device A) maintains a record of each unique pseudo device address after successfully pairing with a targeted device (e.g., Device B). Thus, upon generating a pseudo device address, the devices described are configured to check the record to validate that the generated pseudo device address has not been previously used. Alternatively, the algorithm used to generate the unique pseudo device identifier may preliminarily exclude all other unique pseudo device identifiers in use and generate from the remaining available options. As described in the examples above, in a first example wherein a pseudo OUI is used to generate a pseudo device address, the advertising device may utilize multiple distinct pseudo OUIs and select from those possible pseudo OUIs. In a second example wherein the second component of the device address is substituted out, the advertising device may generate each new unique pseudo identifier based upon an exclusion of all variations of the second component of the device address that are currently in use. The advertising device may then select a unique pseudo device address from the unutilized options for the second component in order to generate the unique pseudo identifier.

When Device A re-advertises using a "pseudo" address, Device B will fail to detect that it has previously connected to Device A. Therefore, Device B will not seek automatic reconnection with Device A. As a result, communication between Device B and Device A will not inhibit or interfere with pairing attempts between Device A and other devices such as Device C.

Device A can then pair (using the "pseudo" device address) with new device Device C without any interference from the data communication between Devices B and A.

Upon such pairing, Device A can correct or update its device address. In one example, Device A may pass the "real" device address to Device C (or any other paired device) via BLUETOOTH® pairing messaging. Alternatively, Device A may pass a third device address to Device C. Accordingly, the updated device address substitutes out the "pseudo" device address. The updated device address may be provided using Identity Address Information provided by the Security Manager Protocol.

The disclosed methods, systems, and devices will ensure that "new" devices can connect to BLUETOOTH® devices that have been previously paired to "old" devices while in the presence of such "old" devices.

Further, the disclosed approach will also enable "old" devices that lost pairing information to behave as "new" devices and repair the broken pairings. Devices may have such broken pairings when their shared information (e.g., their link key) becomes asymmetrical or otherwise stale. For example, as described above, Device A and Device B may previously pair to one another with the understanding that Device A has an address of 123456:23:45:67 and that Device B has a device address of 234567:01:23:45. If Device B deletes or otherwise fails to maintain the link key for Device A, the use of a "pseudo" device identifier by Device A will cause Device B to attempt to pair again because Device B believes it sees a "new" device. If Device A accepts this pairing attempt, the devices can efficiently refresh their relationship.

A technical effect of the systems, methods, and computing devices described herein is to enable efficient BLUETOOTH® device pairing between two BLUETOOTH® enabled computing devices when the devices are in the presence of any BLUETOOTH® enabled computing device that has previously paired to one or both of the devices. The described invention accordingly improves the technical field of BLUETOOTH® networking and wireless networking generally by providing such pairing capabilities without undesired device interference.

A technical effect of the systems and methods described herein is achieved by performing at least one of the following steps: (a) retrieving, at a first computing device, a first BLUETOOTH® device identifier used for identifying the first computing device; (b) converting the first BLU- ETOOTH® device identifier into a second unique BLUETOOTH® device identifier specific to a connection between the first computing device and a second computing device; (c) advertising availability of the first computing device using the second BLUETOOTH® device identifier, wherein the second BLUETOOTH® device identifier is available for use in connection to the second computing device; (d) receiving a pairing request from a second computing device; (e) establishing a BLUETOOTH® communications path between the first computing device and the second computing device, wherein the BLUETOOTH® communications path is created based at least partially on the second BLUETOOTH® device identifier; (f) partitioning the first BLUETOOTH® device identifier into a first portion and a second portion; (g) identifying a "pseudo" organizationally unique identifier; and replacing the first portion of the first BLUETOOTH® device identifier with the "pseudo" organizationally unique identifier; (h) identifying the "pseudo" organizationally unique identifier from a data store in communication with the first computing device; (i) partitioning the first BLUETOOTH® device identifier into a first portion and a second portion, identifying a "pseudo" device specific identifier, and replacing the second portion of the first BLUETOOTH® device identifier with the "pseudo" device specific identifier; (j) identifying the "pseudo" device specific identifier by using at least one of a random number generator, a conversion algorithm, and a data store in communication with the first computing device; (j) retrieving, at the first computing device, the first BLUETOOTH® device identifier used for identifying the first computing device; (l) converting the first BLUETOOTH® device identifier into a third unique BLUETOOTH® device identifier, wherein the third BLUETOOTH® device identifier is distinct from the second BLUETOOTH® device identifier and the first BLUETOOTH® device identifier and is specific to a connection with a third computing device; (m) advertising availability of the first computing device using the third unique BLUETOOTH® device identifier; (n) receiving a pairing request from the third computing device; and (o) establishing a BLUETOOTH® communications path between the first computing device and the third computing device, wherein the BLUETOOTH® communications path is created based at least partially on the third BLUETOOTH® device identifier.

As used herein, the term processor refers to central processing units, microprocessors, microcontrollers, reduced instruction set circuits (RISC), application specific integrated circuits (ASIC), logic circuits, and any other circuit or processor capable of executing the functions described herein.

Disclosed herein is a method that includes receiving BLUETOOTH® address data, altering the BLUETOOTH® address data to a "pseudo" address, and further manipulating the BLUETOOTH® address data. Such variations of the BLUETOOTH® address data may be stored in any format on any storage device in or in communication with the BLUETOOTH® enabled computing devices described herein. The computing devices can convert the BLUETOOTH® address data to a format suitable for storage in reserved memory of a communication device, to form converted BLUETOOTH® address data. The reserved memory may exist in the form of the pre-defined element of the device's Electrically-Erasable Programmable Read-Only Memory (EEPROM). The reserved memory resides on the computing devices and is intended and reserved to store device address information.

Before describing in detail embodiments that are in accordance with the present disclosure, it should be observed that the embodiments reside primarily in combinations of method steps, system elements, and device components related to pairing BLUETOOTH® enabled computing devices. Accordingly, the device components, system elements, and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relative relational terms such as first and second, top and bottom, and the like may be used solely to distinguish one entity or action from another entity or action without necessarily requiring or implying any actual such relationship or order between such entities or actions.

The terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device. An element proceeded by "comprises . . . a" does not, without more constraints, preclude the existence of additional identical elements in the process, method, article, or device that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of preparing a mobile communications device for pairing with a BLUETOOTH® device described herein. The non-processor circuits may include, but are not limited to, a radio receiver, a radio transmitter, signal drivers, clock circuits, power source circuits, and user input devices. As such, these functions may be interpreted as steps of a method to perform preparing a BLUETOOTH® enabled computing device for pairing with another BLUETOOTH® enabled device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates an exemplary configuration 100 of a BLUETOOTH® enabled computing device. Specifically, FIG. 1 illustrates an exemplary configuration 100 of a BLUETOOTH® enabled computing device 110 operated by a user 111 in accordance with one embodiment of the present invention. BLUETOOTH® enabled computing device 110 may include, but is not limited to, mobile computing devices, stationary computing devices, computing peripheral devices, smart phones, wearable computing devices, medical computing devices, and vehicular computing devices. Alternatively, BLUETOOTH® enabled computing device 110 may be any computing device capable of BLUETOOTH® pairing described herein. In some variations, the characteristics of the described components may be more or less advanced, primitive, or non-functional.

In the exemplary embodiment, BLUETOOTH® enabled computing device 110 includes a processor 120 for executing instructions. In some embodiments, executable instructions are stored in a memory area 130. Processor 120 may include one or more processing units, for example, a multi-core configuration. Memory area 130 is any device allowing information such as executable instructions and/or written works to be stored and retrieved. Memory area 130 may include one or more computer readable media.

BLUETOOTH® enabled computing device 110 also includes at least one input/output component 140 for receiving information from and providing information to user 111. In some examples, input/output component 140 may be of limited functionality or non-functional as in the case of some wearable computing devices. In other examples, input/output component 140 is any component capable of conveying information to or receiving information from user 111. In some embodiments, input/output component 140 includes an output adapter such as a video adapter and/or an audio adapter. Input/output component 140 may alternatively include an output device such as a display device, a liquid crystal display (LCD), organic light emitting diode (OLED) display, or "electronic ink" display, or an audio output device, a speaker or headphones. Input/output component 140 may also include any devices, modules, or structures for receiving input from user 111. Input/output component 140 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 140. Input/output component 140 may further include multiple sub-components for carrying out input and output functions.

BLUETOOTH® enabled computing device 110 may also include a communications interface 150, which may be communicatively coupleable to a remote device such as a remote computing device, a remote server, or any other suitable system. Communication interface 150 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX).

Communications interface 150 further includes a BLUETOOTH® transceiver, or BLUETOOTH® interface 160. BLUETOOTH® interface 160 is capable of completing the pairing, bonding, synchronization, and un-pairing steps described herein as well as transmitting communications with other devices. BLUETOOTH® interface 160 may accordingly be used to allow BLUETOOTH® enabled computing device 110 to communicate with any other BLUETOOTH® devices 170.

Generally, BLUETOOTH®-enabled devices establish connection and communications in the following manner A first device ("an advertising device") is placed into pairing mode and advertises its availability via an advertising packet (or a broadcast query). The advertising packet contains a device identifier. Other devices ("scanning devices") may also be placed into pairing mode and scan for available devices. Scanning devices scan by submitting scan requests. In this example, scan requests detect advertised messages sent via broadcast queries such as the advertising packet sent by the advertising device. (Optionally, the scanning devices may send scan requests directly to advertising devices with which they seek to pair. The advertising devices may respond to the scanning device with a scan response, indicating willingness to pair.) The scanning device then sends a connection request to the advertising device. Advertising devices may accept connection request and create a connection with scanning device. Once a connection is established, a communication channel is opened between the advertising and scanning devices. The scanning device sends a pairing request to the advertising device which responds with a pairing response. The pairing response includes a specific device address. Finally, the scanning device completes pairing using the specific device address. At this point, the scanning device and advertising device have established a pairing that may be used for reconnection. They may continue communications or disconnect with the possibility of later reconnection.

Figure 2:
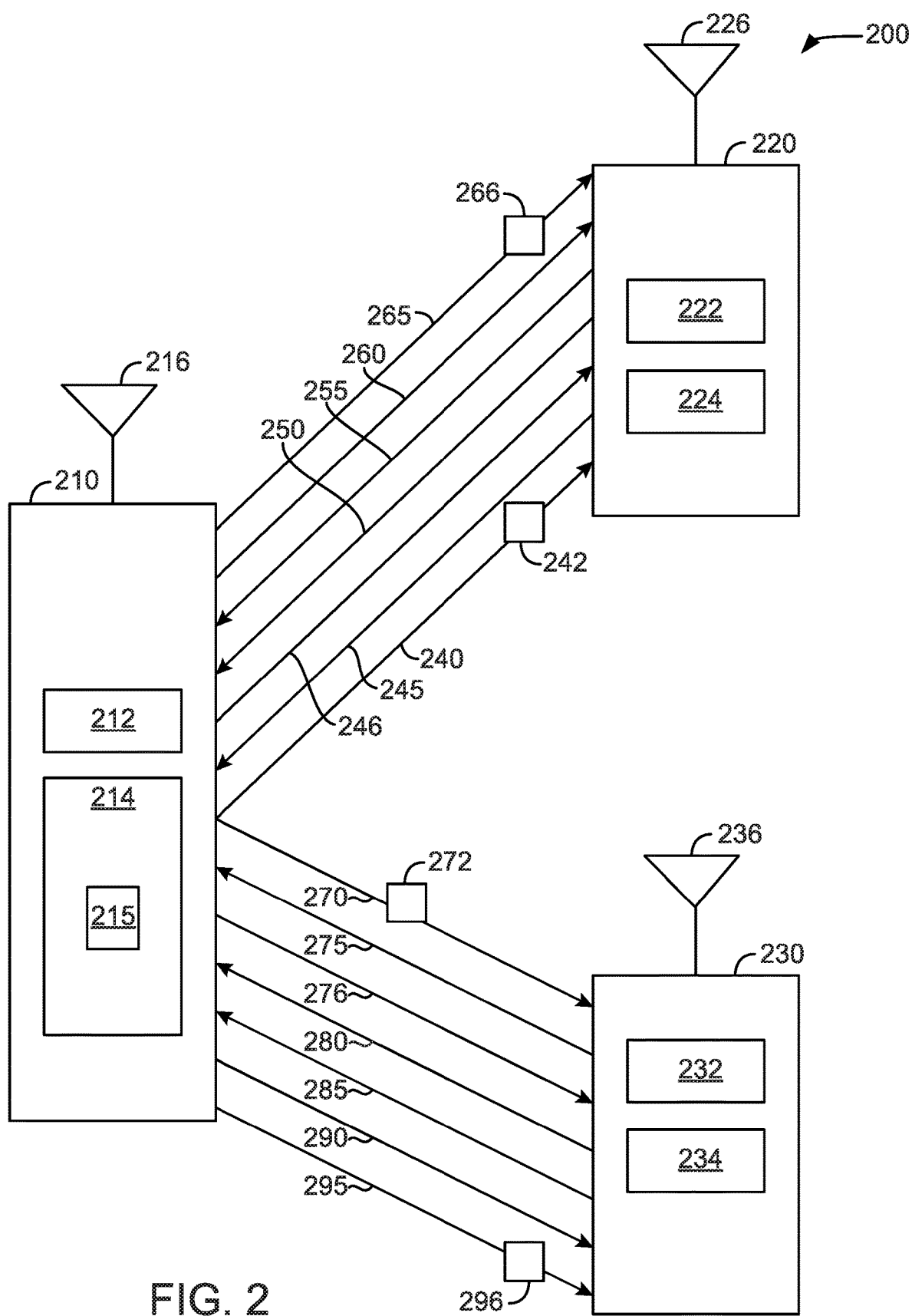
FIG. 2 illustrates exemplary BLUETOOTH® pairing mechanisms, components, and interfaces for pairing the BLUETOOTH® enabled devices of FIG. 1.

FIG. 2 illustrates exemplary BLUETOOTH® pairing mechanisms, components, and interfaces for pairing BLUETOOTH® enabled devices such as BLUETOOTH® enabled computing device 110 shown in FIG. 1. Specifically, FIG. 2 illustrates an exemplary communication system 200 employing BLUETOOTH® technology providing a communications path between BLUETOOTH® enabled computing devices 210, 220, and 230. As described herein, each of BLUETOOTH® enabled computing devices 210, 220, and 230 may be described by computing device 110. Accordingly, each BLUETOOTH® enabled computing device 210, 220, and 230 has an associated processor 212, 222, and 232 respectively, an associated memory 214, 224, and 234 respectively, and a BLUETOOTH® interface 216, 226, 236 respectively.

As described above and herein, BLUETOOTH® protocol employs a pairing process to establish a new relationship between two BLUETOOTH® enabled devices before they can exchange data. In this context, pairing refers to a mechanism where the two devices are exchanging protected link keys and resultantly form a bond. Pairing may be described in terms of a discovery and authentication mechanism. Once paired, all data and information transmitted over the resulting pathway BLUETOOTH® link may be encrypted and only devices authorized during the pairing process will be able to receive and decipher this encrypted transmission. In system 200, in order to establish a pairing between any of BLUETOOTH® enabled computing device 210 and computing devices 220 or 230, computing device 210 advertises its availability using a pseudo device identifier and may be discovered by devices such as computing devices 220 and 230. Computing device 210 may therefore be referred to as the "advertising device" (i.e., functioning in the role of Device A in the examples above) as it advertises its availability for pairing in this example. (Nevertheless, computing device 210 may serve as a scanning device in other examples.) For clarity, in this example, we may assume that computing device 220 first pairs with computing device 210 before computing device 230 pairs with computing device 210.

More specifically, computing device 210 is placed into pairing mode and advertises its availability via an advertising packet 240. Advertising packet 240 contains device identifier 242. As described herein, device identifier 242 reflects a first pseudo device identifier formed based on a specific device address 215 specified in memory 214. In the example embodiment, device identifier is a 48-bit address represented as a 12-digit hexadecimal value. The first 24 bits of the address (i.e., the first six hexadecimal digits) constitute an Organizationally Unique Identifier ("OUI") that is assigned by BLUETOOTH® Registration Authorities. The second 24 bits (i.e., the last six hexadecimal digits) are specific to an individual device within the context of the OUI. However, all 12 hexadecimal digits are used to fully identify any given device. For clarity, an exemplary specific device address 215 may be given as shown in the table below (Table 1):

TABLE 1

| Organizationally Unique Identifier | Device Specific Identifier |
|---|---|
| 13579A | 23:45:67 |

As noted in Table 1, the unmodified standard device identifier includes a first component associated with the organizationally unique identifier (OUI) and a second component associated with a device specific identifier. The systems described herein illustrate two methods for converting the unmodified standard device identifier to a pseudo device identifier.

Specifically, in one example, computing device 210 substitutes the Organizationally Unique Identifier "13579A" from the first component with another Organizationally Unique Identifier. (In this example, the substituted Organizationally Unique Identifier is also registered with the BLUETOOTH® Registration Authorities.) For clarity, one exemplary "pseudo" device identifier generated in this manner may be given as shown in the table below (Table 2):

TABLE 2

| Organizationally Unique Identifier | Device Specific Identifier |
|---|---|
| 2468BD | 23:45:67 |

The substitute Organizationally Unique Identifier may be obtained from a data store that is in communication with computing device 210. For example, the substitute Organizationally Unique Identifier may be stored in memory 214 or on any external data store that is in communication with computing device 210.

In a second example, computing device 210 substitutes the Device Specific Identifier from the second component shown in Table 1 with another Device Specific Identifier. In this example, the substitute Device Specific Identifier may be generated using any suitable method including a random number generator, a conversion algorithm that processes the "real" Device Specific Identifier into the substitute Device Specific Identifier in an algorithmic manner. Alternatively, computing device 210 may retrieve the substitute Device Specific Identifier from an internal or external data store that is in communication with computing device 210. For clarity, a second exemplary "pseudo" device identifier generated in this manner may be given as shown in the table below (Table 3):

TABLE 3

| Organizationally Unique Identifier | Device Specific Identifier |
|---|---|
| 13579A | 0A:BC:DE |

Scanning device 220 is also placed into pairing mode and scans for available devices. Scanning device 220 scans by submitting a scan request 245.

In this example, scanning device 220 is in discovery mode and detects advertised messages sent via broadcast queries such as the advertising packet 240 sent by the advertising device 210. Optionally, the scanning device 220 may send scan a scan request 245 directly to advertising device 210 with which it seeks to pair. Advertising device 210 may respond to the scanning device 220 with a scan response 246, indicating willingness to pair.

Scanning device 220 sends a connection request 250 to advertising device 210. Advertising device 210 accepts connection request 250 and creates a connection with scanning device 220. Once a connection is established, a communication channel is opened between the advertising 210 and scanning 220 devices. Scanning device 220 sends pairing request 255 to advertising device 210 which responds with pairing response 260.

Subsequently, in further pairing messaging, devices 210 and 220 may exchange an Identity Address information string. In this step, advertising device 210 may provide an Identity Address information string 265 including a device address 266. Scanning device 220 may complete pairing using device address 266. In one embodiment, by providing Identity Address information string 265 with device address 266, advertising device 210 provides its "real" identity to scanning device 220.

However, in a further embodiment, device address 266 is the same as device identifier 242 and both device identifier 242 and device address 266 are unique "pseudo" device identifiers for advertising device 210. As described herein, the use of such a unique "pseudo" device identifier allows for selective advertising, reduced competition for connection to advertising device 210, and reduced chances of message collisions.

In either embodiment, at this point scanning device 220 and advertising device 210 have established a pairing that may be used for reconnection. They may continue communications or disconnect with the possibility of later reconnection.

At some point thereafter, computing devices 210 and 220 may disconnect. Device identifier 242 used in pairing computing devices 210 and 220 may reflect a pseudo device identifier generated according to one of the methods described above. Computing device 210 may be configured to verify that device identifier 242 is unique and does not match any other device identifiers used by computing device 210 to communicate with any other computing devices.

As computing device 210 has previously paired with computing device 220, computing device 210 may seek to advertise selectively in order to pair with other devices (i.e., devices other than computing device 220). To do so, computing device 210 must disguise itself so that computing device 220 will not reconnect when it recognizes device identifier 242. As such, in the unique addressing embodiment computing device 210 generates a pseudo device identifier 272 distinct from device identifier 242 (and distinct from device address 266). If computing device 230 is in discovery mode, computing device 230 sees the pseudo device identifier 272 and believes that computing device 210 is a new device available for pairing.

At this point, computing device 220 is not in pairing mode, but is rather seeking to re-connect with previously paired devices. Thus, computing device 220 may see a device indicated by pseudo device identifier 272 but will not recognize this identifier as being associated with computing device 210. Thus, while computing device 220 may send scan requests 245, it will not see computing device 210 as a device with which it has previously connected and will therefore ignore it for the purposes of reconnection. Computing device 230 is in discovery mode and will seek to pair with new devices. Upon seeing advertising packet 270 containing pseudo device identifier 272, computing device 230 recognizes a new device and sends a scan request 275 to computing device 210. Similarly to the manner previously discussed, computing device 210 may send scan response 276 indicating a willingness to pair.

Scanning device 230 sends a connection request 280 to advertising device 210. Advertising device 210 accepts connection request 280 and creates a connection with scanning device 230. Once a connection is established, a communication channel is opened between the advertising 210 and scanning 230 devices. Scanning device 230 sends pairing request 285 to advertising device 210 which responds with pairing response 290. Subsequently, in further pairing messaging, devices may exchange an Identity Address information string. In this step, advertising device 210 may provide an Identity Address information string 295 including a device address 296.

Scanning device 230 may complete pairing using device address 296. In one embodiment, by providing Identity Address information string 295 with device address 296, advertising device 210 provides its "real" identity to scanning device 230.

However, as described above, device address 296 may also be the same as device identifier 272 and both device identifier 272 and device address 296 are unique "pseudo" device identifiers for advertising device 210. As described herein, the use of such a unique "pseudo" device identifier allows for selective advertising, reduced competition for connection to advertising device 210, and reduced chances of message collisions.

In either embodiment, at this point scanning device 230 and advertising device 210 have established a pairing that may be used for reconnection. They may continue communications or disconnect with the possibility of later reconnection.

After the steps described above, BLUETOOTH® enabled computing devices 210, 220, and 230 have pairing relationships such that computing devices 210 and 220 are paired and computing devices 210 and 230 are paired. As such, any time reconnecting computing devices 210, 220, and 230 detect a paired device in a communicable range, the paired devices will seek to connect and may begin transmission of information.

During reconnection, previously paired devices will look for one another based upon the device identifier they associate with their pairing. As described herein, advertising device 210 may initially advertise its identity to a scanning device 220 or 230 with a pseudo identifier 242 or 272 and later replace this identifier with a device address 266 or 296 that is the specific device address 215 for advertising device 210. In such examples, if advertising device 210 later advertises its identity with its specific device address 215, both scanning device 220 and 230 may seek to reconnect.

However, in a further embodiment advertising device 210 maintains distinct unique pseudo device identifiers 242 and 272 that persist as pseudo device addresses 266 and 296. In such examples, advertising device 210 may selectively choose a particular pseudo device address to allow reconnection for only a particular scanning device. For example, if advertising device 210 advertises that it has pseudo device address 266, only scanning device 220 will seek to reconnect while scanning device 230 will believe that it has not previously paired with that device. Alternatively, if advertising device 210 advertises that it has pseudo device address 296, only scanning device 230 will seek to reconnect while scanning device 220 will believe that it has not previously paired with that device.

Figure 3:
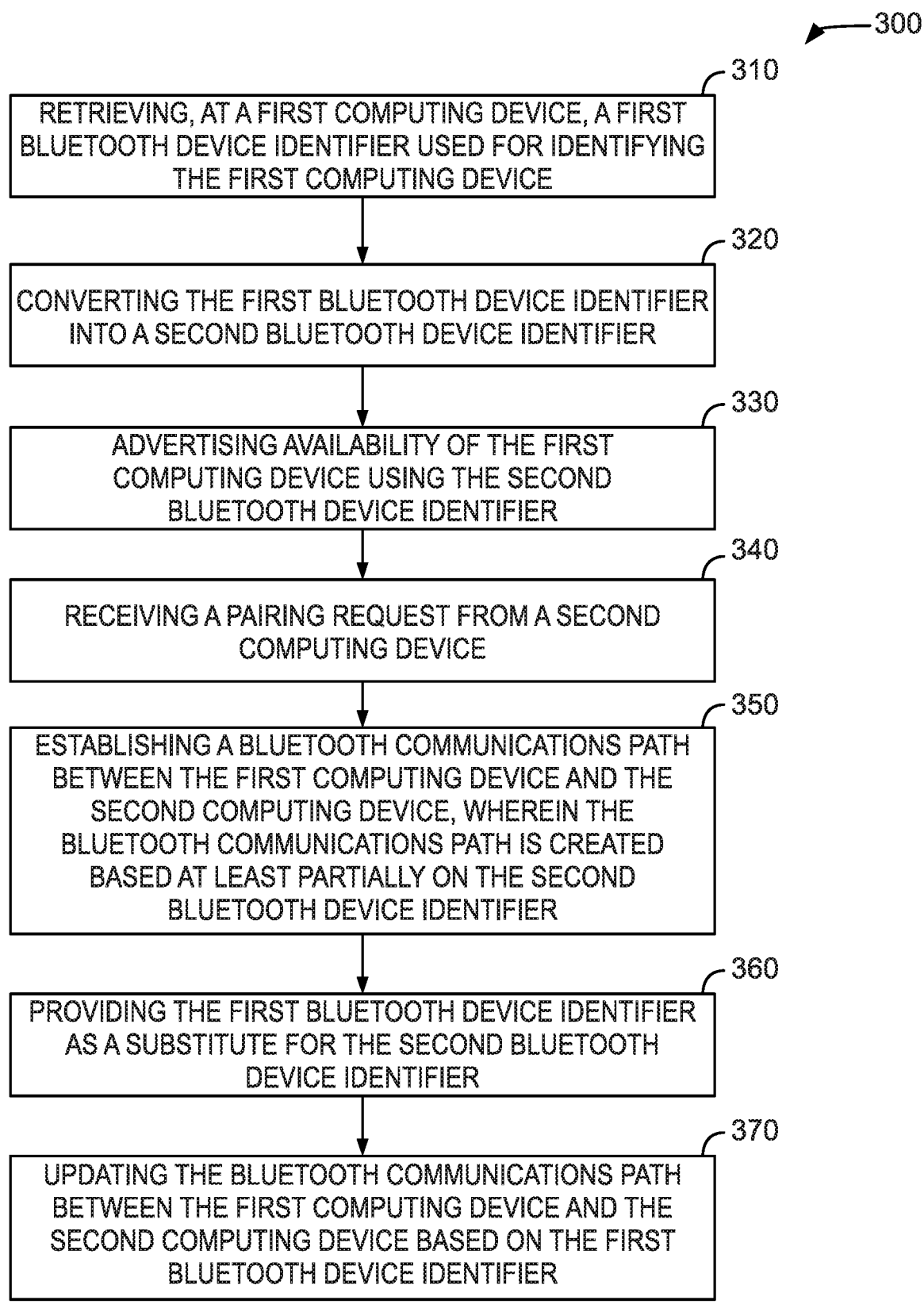
FIG. 3 is a flowchart representing the general method of enhanced BLUETOOTH® pairing in accordance with the present design.

Referring to FIG. 3, a flowchart 300 representing the general method of enhanced BLUETOOTH® pairing in accordance with the present design is shown. In flowchart 300, prior to attempting to pair with a BLUETOOTH® enabled computing device 220 or 230, first BLUETOOTH® enabled computing device 210 retrieves 310 BLUETOOTH® device identifier from memory 214 or any suitable data store that it is in communication with. The BLUETOOTH® device identifier may be represented as specific device address 215. First BLUETOOTH® enabled computing device 210 converts 320 the retrieved BLUETOOTH® device identifier to a second (or "pseudo") device identifier 242. In some examples, this conversion may be accomplished using the techniques described above. Specifically, first BLUETOOTH® enabled computing device 210 may partition BLUETOOTH® device identifier (as given by specific device address 215) into a first portion and a second portion such that the first portion represents the Organizationally Unique Identifier and the second portion represents the Device Specific Identifier. In one example, first BLUETOOTH® enabled computing device 210 may then identify a "pseudo" organizationally unique identifier from a data store that is in communication with first BLUETOOTH® enabled computing device 210. In a second example, first BLUETOOTH® enabled computing device 210 may generate a substitute Device Specific Identifier using any suitable method including a random number generator, a conversion algorithm, and retrieval of the substitute Device Specific Identifier from an internal or external data store. In either example, first BLUETOOTH® enabled computing device 210 replaces either the first portion of first BLUETOOTH® device identifier (as given by specific device address 215) with the "pseudo" organizationally unique identifier or the second portion of first BLUETOOTH® device identifier (as given by specific device address 215) with the "pseudo" device specific identifier.

In other examples, first BLUETOOTH® enabled computing device 210 may convert first BLUETOOTH® device identifier (as given by specific device address 215) to second BLUETOOTH® device identifier 242 using any other suitable means.

First BLUETOOTH® enabled computing device 210 further advertises 330 the availability of first computing device 210 for pairing using second BLUETOOTH® device identifier 242. Specifically, first BLUETOOTH® enabled computing device 210 sends communications including advertising packet 240 that contain second (or "pseudo") device identifier 242.

First BLUETOOTH® enabled computing device 210 additionally receives 340 a pairing request from a second computing device (in this example, BLUETOOTH® enabled computing device 220 or 230). First BLUETOOTH® enabled computing device 210 may accordingly receive an inquiry response containing a device identifier for the second computing device.

First BLUETOOTH® enabled computing device 210 further establishes 350 a BLUETOOTH® communications path between first computing device 210 and second computing device 220 or 230. The BLUETOOTH® communications path is created based at least partially on the second (or "pseudo") device identifier 242.

In most examples, the "pseudo" device identifier 242 is a temporary identifier that is subsequently replaced with a more permanent device identifier. In the exemplary example, second device identifier 242 may be replaced with device identifier as given by specific device address 215. Specifically, first BLUETOOTH® enabled computing device 210 retrieves or provides 360 first BLUETOOTH® device identifier (as given by specific device address 215) as a substitute for second BLUETOOTH® device identifier 242. First BLUETOOTH® enabled computing device 210 further updates 370 the BLUETOOTH® communications path between first computing device 210 and second computing device 220 or 230 based on the first BLUETOOTH® device identifier (as given by specific device address 215).

In other examples, first BLUETOOTH® enabled computing device 210 replaces second device identifier 242 with a new device identifier.

With the BLUETOOTH® communications path created, BLUETOOTH® enabled computing devices 210 and 230 further communicate data using the updated BLUETOOTH® communications path based on first BLUETOOTH® device identifier (as given by specific device address 215).

As described above, in some examples, the systems and methods described may also allow devices such as first and second BLUETOOTH® enabled computing devices 210 and 220 to "re-pair" after a break in their pairing. For example, If first BLUETOOTH® enabled computing device 210 deletes or otherwise fails to maintain the link key for second BLUETOOTH® enabled computing device 220, the broadcast of "pseudo" device identifier 242 by first BLUETOOTH® enabled computing device 210 will cause second BLUETOOTH® enabled computing device 220 to attempt to pair again because second BLUETOOTH® enabled computing device 220 believes it sees a "new" device. If first BLUETOOTH® enabled computing device 210 accepts this pairing attempt, the devices can efficiently refresh their relationship.

Figure 4:
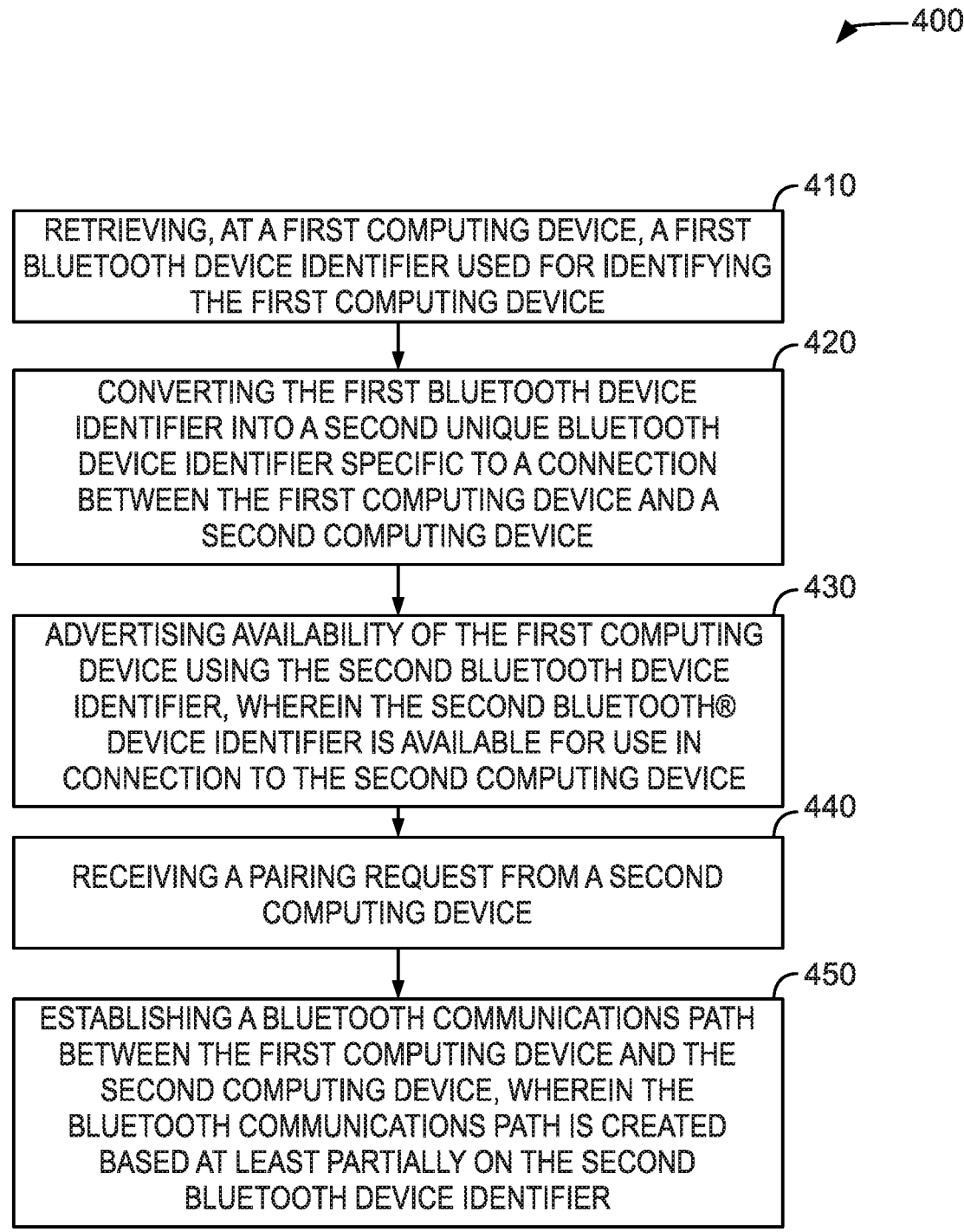
FIG. 4 is a flowchart representing the general method of enhanced BLUETOOTH® pairing in accordance with the present design.

Referring to FIG. 4, a flowchart 400 representing a second method of enhanced BLUETOOTH® pairing in accordance with the present design is shown. In flowchart 400, prior to attempting to pair with a BLUETOOTH® enabled computing device 220 or 230, first BLUETOOTH® enabled computing device 210 retrieves 410 BLUETOOTH® device identifier from memory 214 or any suitable data store that it is in communication with. The BLUETOOTH® device identifier may be represented as specific device address 215. First BLUETOOTH® enabled computing device 210 converts 420 the retrieved BLUETOOTH® device identifier to a second (or "pseudo") device identifier 242 that is specific to a connection between first computing device 210 and a second computing device (e.g., computing device 220). In some examples, this conversion may be accomplished using the techniques described above. Specifically, first BLUETOOTH® enabled computing device 210 may retrieve all pseudo device identifiers used for any connections to other computing devices to ensure that pseudo device identifier 242 is unique and specific to a connection between first computing device 210 and a second computing device 220.

Further, first computing device 210 may partition BLUETOOTH® device identifier (as given by specific device address 215) into a first portion and a second portion such that the first portion represents the Organizationally Unique Identifier and the second portion represents the Device Specific Identifier. In one example, first BLUETOOTH® enabled computing device 210 may then identify a "pseudo" organizationally unique identifier from a data store that is in communication with first BLUETOOTH® enabled computing device 210. In a second example, first BLUETOOTH® enabled computing device 210 may generate a substitute Device Specific Identifier using any suitable method including a random number generator, a conversion algorithm, and retrieval of the substitute Device Specific Identifier from an internal or external data store. In either example, first BLUETOOTH® enabled computing device 210 replaces either the first portion of first BLUETOOTH® device identifier (as given by specific device address 215) with the "pseudo" organizationally unique identifier or the second portion of first BLUETOOTH® device identifier (as given by specific device address 215) with the "pseudo" device specific identifier.

In other examples, first BLUETOOTH® enabled computing device 210 may convert first BLUETOOTH® device identifier (as given by specific device address 215) to second BLUETOOTH® device identifier 242 using any other suitable means.

Upon generating second BLUETOOTH® device identifier 242, computing device 210 may validate that second BLUETOOTH® device identifier 242 is uniquely specific to a connection between first computing device 210 and a second computing device 220. In examples where second BLUETOOTH® device identifier 242 is determined to not be unique, first computing device 210 may create an alternative second BLUETOOTH® device identifier 242 until a unique identifier is achieved.

First BLUETOOTH® enabled computing device 210 further advertises 430 the availability of first computing device 210 for pairing using second BLUETOOTH® device identifier 242. Specifically, first BLUETOOTH® enabled computing device 210 sends communications including advertising packet 240 that contain second (or "pseudo") device identifier 242.

First BLUETOOTH® enabled computing device 210 additionally receives 440 a pairing request from a second computing device (in this example, BLUETOOTH® enabled computing device 220 or 230). First BLUETOOTH® enabled computing device 210 may accordingly receive an inquiry response containing a device identifier for the second computing device.

First BLUETOOTH® enabled computing device 210 further establishes 450 a BLUETOOTH® communications path between first computing device 210 and second computing device 220 or 230. The BLUETOOTH® communications path is created based at least partially on the second (or "pseudo") device identifier 242.

Figure 5:
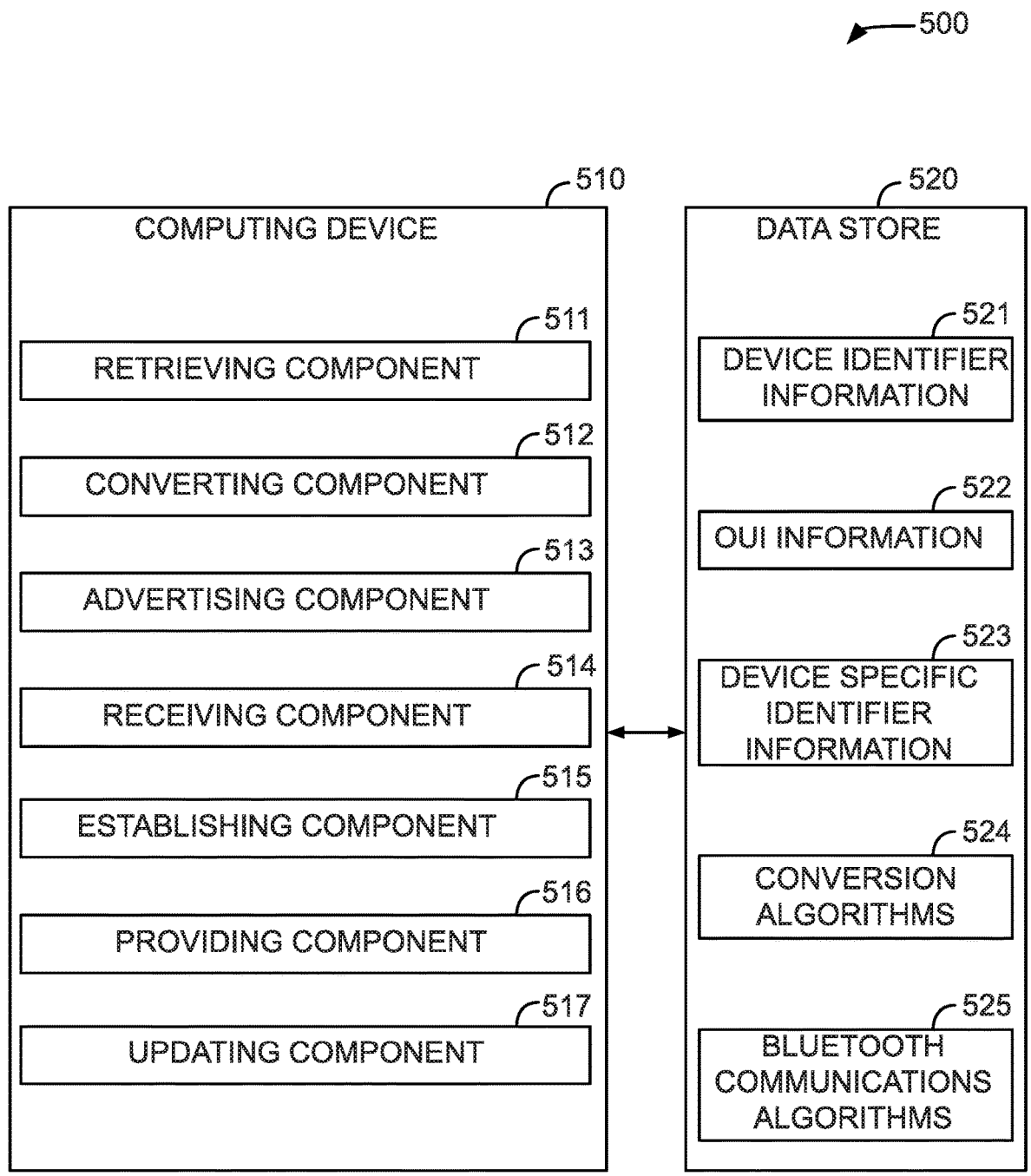
FIG. 5 is a diagram of elements of one or more example computing devices that may be used in the system shown in FIGS. 3 and 4.

FIG. 5 is a diagram 500 of components of one or more example computing devices that may be used in the system 200 shown in FIG. 2. In some embodiments, computing device 510 is similar to BLUETOOTH® enabled computing device 110.

Data store 520 may be stored at memory 130 (shown in FIG. 1) or any other suitable location. Data store 520 may be coupled with several separate components 511, 512, 513, 514, 515, 516, and 517 within computing device 410, which perform specific tasks.

In this embodiment, data store 520 includes device identifier information 521, pseudo Organizationally Unique Identifier information 522, pseudo Device Specific Identifier information 523, conversion algorithms 524, and BLUETOOTH® communications algorithms 525. Computing device 510 may include data store 520, as well as data storage devices (not shown).

Computing device 510 also includes a retrieving component 511 for retrieving a first BLUETOOTH® device identifier used for identifying the first computing device, a converting component 512 for converting the first BLUETOOTH® device identifier into a second BLUETOOTH® device identifier, an advertising component 513 for advertising availability of the first computing device using the second BLUETOOTH® device identifier, a receiving component 514 for receiving a pairing request from a second computing device, an establishing component 515 for establishing a BLUETOOTH® communications path between the first computing device and the second computing device, a providing component 516 for providing the first BLUETOOTH® device identifier as a substitute for the second BLUETOOTH® device identifier, and an updating component 517 for updating the BLUETOOTH® communications path between the first computing device and the second computing device based on the first BLUETOOTH® device identifier.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

All of the patents, patent applications, patent application publications and other publications recited herein are hereby incorporated by reference as if set forth in their entirety.

The present inventive concept has been described in connection with what are presently considered to be the most practical and preferred embodiments. However, the inventive concept has been presented by way of illustration and is not intended to be limited to the disclosed embodiments. Accordingly, one of skill in the art will realize that the inventive concept is intended to encompass all modifications and alternative arrangements within the spirit and scope of the inventive concept as set forth in the appended claims. Numbered embodiments are presented below.

Numbered Embodiments

In addition or as an alternative to the above, the following embodiments are described:

1. A method for pairing of BLUETOOTH®-enabled devices performed by a first computing device, the method comprising the steps of:

retrieving, at a first computing device, a first BLUETOOTH® device identifier used for identifying the first computing device;

converting the first BLUETOOTH® device identifier into a second BLUETOOTH® device identifier;

advertising availability of the first computing device using the second BLUETOOTH® device identifier;

receiving a pairing request from a second computing device;

establishing a BLUETOOTH® communications path between the first computing device and the second computing device, wherein the BLUETOOTH® communications path is created based at least partially on the second BLUETOOTH® device identifier;

providing the first BLUETOOTH® device identifier as a substitute for the second BLUETOOTH® device identifier; and updating the BLUETOOTH® communications path between the first computing device and the second computing device based on the first BLUETOOTH® device identifier.

2. The method according to Embodiment 1, further comprising:

communicating data with the second computing device using the updated BLUETOOTH® communications path based on the first BLUETOOTH® device identifier.

3. The method according to Embodiment 1 or 2, wherein converting the first BLUETOOTH® device identifier into a second BLUETOOTH® device identifier comprises:

partitioning the first BLUETOOTH® device identifier into a first portion and a second portion;

identifying a "pseudo" organizationally unique identifier; and replacing the first portion of the first BLUETOOTH® device identifier with the "pseudo" organizationally unique identifier.

4. The method according to Embodiment 3, wherein the "pseudo" organizationally unique identifier is obtained from a data store in communication with the first computing device.

5. The method according to Embodiment 1, wherein converting the first BLUETOOTH® device identifier into a second BLUETOOTH® device identifier comprises:

partitioning the first BLUETOOTH® device identifier into a first portion and a second portion;

identifying a "pseudo" device identifier; and replacing the second portion of the first BLUETOOTH® device identifier with the "pseudo" device identifier.

6. The method according to Embodiment 5, wherein the "pseudo" device identifier is identified by using at least one of a random number generator, a conversion algorithm, and a data store in communication with the first computing device.

7. The method according to any one of Embodiments 1-6, further comprising:

retrieving, at the first computing device, the first BLUETOOTH® device identifier used for identifying the first computing device;

converting the first BLUETOOTH® device identifier into a third BLUETOOTH® device identifier, wherein the third BLUETOOTH® device identifier is distinct from the second BLUETOOTH® device identifier and the first BLUETOOTH® device identifier;

advertising availability of the first computing device using the third BLUETOOTH® device identifier;

receiving a pairing request from a third computing device;

establishing a BLUETOOTH® communications path between the first computing device and the third computing device, wherein the BLUETOOTH® communications path is created based at least partially on the third BLUETOOTH® device identifier;

providing the first BLUETOOTH® device identifier as a substitute for the third BLUETOOTH® device identifier; and updating the BLUETOOTH® communications path between the first computing device and the third computing device based on the first BLUETOOTH® device identifier.

8. A system for improved pairing of BLUETOOTH®-enabled devices, the system comprising:

a first BLUETOOTH®-enabled computing device comprising a first processor, a first memory, and a first transceiver; and a second BLUETOOTH®-enabled computing device comprising a second processor, a second memory, and a second transceiver, wherein said first processor is configured to:

retrieve a first BLUETOOTH® device identifier used for identifying said first computing device;

convert the first BLUETOOTH® device identifier into a second BLUETOOTH® device identifier;

advertise availability of said first computing device using the second BLUETOOTH® device identifier;

receive a pairing request from said second computing device;

establish a BLUETOOTH® communications path between said first computing device and said second computing device, wherein said BLUETOOTH® communications path is created based at least partially on the second BLUETOOTH® device identifier;

provide the first BLUETOOTH® device identifier as a substitute for the second BLUETOOTH® device identifier; and update said BLUETOOTH® communications path between said first computing device and said second computing device based on said first BLUETOOTH® device identifier.

9. The system of Embodiment 8, wherein said first processor is further configured to:

communicate data with said second computing device using said updated BLUETOOTH® communications path based on the first BLUETOOTH® device identifier.

10. The system of Embodiment 8 or 9, wherein said first processor is further configured to:

partition the first BLUETOOTH® device identifier into a first portion and a second portion;

identify a "pseudo" organizationally unique identifier; and replace the first portion of the first BLUETOOTH® device identifier with the "pseudo" organizationally unique identifier.

11. The system of Embodiment 10, wherein said first processor is further configured to identify the "pseudo" organizationally unique identifier from a data store in communication with said first computing device.

12. The system of Embodiment 8 or 9, wherein said first processor is further configured to:

partition the first BLUETOOTH® device identifier into a first portion and a second portion;

identify a "pseudo" device identifier; and replace the second portion of the first BLUETOOTH® device identifier with the "pseudo" device identifier.

13. The system of Embodiment 12, wherein said first processor is further configured to identify the "pseudo" device identifier by using at least one of a random number generator, a conversion algorithm, and a data store in communication with said first computing device.

14. The system of any one of Embodiments 8-13, wherein said first processor is further configured to:

retrieve the first BLUETOOTH® device identifier used for identifying said first computing device;

convert the first BLUETOOTH® device identifier into a third BLUETOOTH® device identifier, wherein the third BLUETOOTH® device identifier is distinct from the second BLUETOOTH® device identifier and the first BLUETOOTH® device identifier;

advertise availability of said first computing device using the third BLUETOOTH® device identifier;

receive a pairing request from a third computing device;

establish a BLUETOOTH® communications path between said first computing device and said third computing device, wherein said BLUETOOTH® communications path is created based at least partially on the third BLUETOOTH® device identifier;

provide the first BLUETOOTH® device identifier as a substitute for the third BLUETOOTH® device identifier; and update said BLUETOOTH® communications path between said first computing device and said third computing device based on the first BLUETOOTH® device identifier.

15. A BLUETOOTH®-enabled computing device for improved BLUETOOTH® pairing, said computing device comprising:

a processor, a memory, and a transceiver, said processor configured to:

retrieve a first BLUETOOTH® device identifier used for identifying said computing device;

convert the first BLUETOOTH® device identifier into a second BLUETOOTH® device identifier;

advertise availability of said computing device using the second BLUETOOTH® device identifier;

receive a pairing request from a second computing device;

establish a BLUETOOTH® communications path between said computing device and said second computing device, wherein said BLUETOOTH® communications path is created based at least partially on the second BLUETOOTH® device identifier;

provide the first BLUETOOTH® device identifier as a substitute for the second BLUETOOTH® device identifier; and update said BLUETOOTH® communications path between said computing device and said second computing device based on said first BLUETOOTH® device identifier.

16. The BLUETOOTH®-enabled computing device of Embodiment 15, wherein said processor is further configured to:
communicate data with said second computing device using said updated BLUETOOTH® communications path based on the first BLUETOOTH® device identifier.

17. The BLUETOOTH®-enabled computing device of Embodiment 15 or 16, wherein said processor is further configured to:
partition the first BLUETOOTH® device identifier into a first portion and a second portion;
identify a "pseudo" organizationally unique identifier; and
replace the first portion of the first BLUETOOTH® device identifier with the "pseudo" organizationally unique identifier.

18. The BLUETOOTH®-enabled computing device of Embodiment 17, wherein said processor is further configured to identify the "pseudo" organizationally unique identifier from a data store in communication with said computing device.

19. The BLUETOOTH®-enabled computing device of Embodiment 15 or 16, wherein said processor is further configured to:
partition the first BLUETOOTH® device identifier into a first portion and a second portion;
identify a "pseudo" device identifier; and
replace the second portion of the first BLUETOOTH® device identifier with the "pseudo" device identifier.

20. The BLUETOOTH® enabled computing device of Embodiment 19, wherein said processor is further configured to identify the "pseudo" device identifier by using at least one of a random number generator, a conversion algorithm, and a data store in communication with said first computing device.

21. The BLUETOOTH®-enabled computing device of any one of embodiments 15-20, wherein said processor is further configured to:
retrieve the first BLUETOOTH® device identifier used for identifying said computing device;
convert the first BLUETOOTH® device identifier into a third BLUETOOTH® device identifier, wherein the third BLUETOOTH® device identifier is distinct from the second BLUETOOTH® device identifier and the first BLUETOOTH® device identifier;
advertise availability of said computing device using the third BLUETOOTH® device identifier;
receive a pairing request from a third computing device;
establish a BLUETOOTH® communications path between said computing device and said third computing device, wherein said BLUETOOTH® communications path is created based at least partially on the third BLUETOOTH® device identifier;
provide the first BLUETOOTH® device identifier as a substitute for the third BLUETOOTH® device identifier; and
update said BLUETOOTH® communications path between said computing device and said third computing device based on the first BLUETOOTH® device identifier.

22. A method for pairing of BLUETOOTH®-enabled devices performed by a first computing device as substantially described and shown herein.

23. A system for improved pairing of BLUETOOTH®-enabled devices as substantially described and shown herein.

24. A BLUETOOTH®-enabled computing device as substantially described and shown herein.

LISTING OF REFERENCE NUMBERS

100 Configuration
110 BLUETOOTH®-enabled computing device
111 User
120 Processor
130 Memory area
140 Input/output component
150 Communication interface
160 BLUETOOTH® interface
170 Additional BLUETOOTH® devices
200 Communication system
210 BLUETOOTH®-enabled computing device
212 Processor
214 Memory
215 Device address
216 BLUETOOTH® interface
220 BLUETOOTH®-enabled computing device
222 Processor
224 Memory
226 BLUETOOTH® interface
230 BLUETOOTH®-enabled computing device
232 Processor
234 Memory
236 BLUETOOTH® interface
240 Advertising packet
242 Device identifier
245 Scan requests
246 Scan response
250 Connection request
255 Pairing request
260 Pairing response
265 Identity Address information string
266 Device address
270 Advertising packet
272 Device identifier
275 Scan request
276 Scan response
280 Connection request
285 Pairing request
290 Pairing response
295 Identity Address information string
296 Device address
300 Flowchart
310 Retrieving step
320 Converting step
330 Advertising step
340 Receiving step
350 Establishing step
360 Providing/retrieving step
370 Updating step
400 Flowchart
410 Retrieving step
420 Converting step
430 Advertising step
440 Receiving step
450 Establishing step
500 Diagram
510 Computing device
511 Retrieving component
512 Converting component 513 Advertising component
514 Receiving component
515 Establishing component
516 Providing component
517 Updating component
520 Data store
521 Device identifier information
522 OUI information
523 Device-specific identifier information
524 Conversion algorithms
525 BLUETOOTH® communications algorithms

What is claimed:

1. A method for pairing of BLUETOOTH® enabled devices performed by a first computing device, the method comprising:
   a) retrieving, at a first computing device, a first BLUETOOTH® device identifier used for identifying the first computing device;
   b) converting the first BLUETOOTH® device identifier into a second BLUETOOTH® device identifier;
   c) advertising availability of the first computing device using the second BLUETOOTH® device identifier;
   d) receiving a pairing request from a second computing device;
   e) establishing a BLUETOOTH® communications path between the first computing device and the second computing device in response to the pairing request, wherein the BLUETOOTH® communications path is created based at least partially on the second BLUETOOTH® device identifier;
   f) providing, with the first computing device, the first BLUETOOTH® device identifier to the second computing device using the BLUETOOTH® communications path, the first BLUETOOTH® device identifier being a substitute for the second BLUETOOTH® device identifier; and
   g) updating the BLUETOOTH® communications path between the first computing device and the second computing device based on the first BLUETOOTH® device identifier after the providing of the first BLUETOOTH® device identifier to the second computing device.

2. The method according to claim 1, further comprising: communicating data with the second computing device using the updated BLUETOOTH® communications path based on the first BLUETOOTH® device identifier.

3. The method according to claim 1, wherein converting the first BLUETOOTH® device identifier into a second BLUETOOTH® device identifier comprises:
   partitioning the first BLUETOOTH® device identifier into a first portion and a second portion;
   identifying a "pseudo" organizationally unique identifier; and
   replacing the first portion of the first BLUETOOTH® device identifier with the "pseudo" organizationally unique identifier.

4. The method according to claim 3, wherein the "pseudo" organizationally unique identifier is obtained from a data store in communication with the first computing device.

5. The method according to claim 1, wherein converting the first BLUETOOTH® device identifier into a second BLUETOOTH® device identifier comprises:
   partitioning the first BLUETOOTH® device identifier into a first portion and a second portion;
   identifying a "pseudo" device specific identifier; and
   replacing the second portion of the first BLUETOOTH® device identifier with the "pseudo" device specific identifier.

6. The method according to claim 5, wherein the "pseudo" device specific identifier is identified by using at least one of a random number generator, a conversion algorithm, and a data store in communication with the first computing device.

7. The method according to claim 1, further comprising:
   a) retrieving, at the first computing device, the first BLUETOOTH® device identifier used for identifying the first computing device;
   b) converting the first BLUETOOTH® device identifier into a third BLUETOOTH® device identifier, wherein the third BLUETOOTH® device identifier is distinct from the second BLUETOOTH® device identifier and the first BLUETOOTH® device identifier;
   c) advertising availability of the first computing device using the third BLUETOOTH® device identifier;
   d) receiving a pairing request from a third computing device;
   e) establishing a BLUETOOTH® communications path between the first computing device and the third computing device in response to the pairing request, wherein the BLUETOOTH® communications path is created based at least partially on the third BLUETOOTH® device identifier;
   f) providing, with the first computing device, the first BLUETOOTH® device identifier to the third computing device using the BLUETOOTH® communications path, the first BLUETOOTH® device identifier being a substitute for the third BLUETOOTH® device identifier; and
   g) updating the BLUETOOTH® communications path between the first computing device and the third computing device based on the first BLUETOOTH® device identifier after the providing of the first BLUETOOTH® device identifier to the third computing device.

8. A system for improved pairing of BLUETOOTH® enabled devices, the system comprising:
   a first BLUETOOTH® enabled computing device comprising a first processor, a first memory, and a first transceiver; and
   a second BLUETOOTH® enabled computing device comprising a second processor, a second memory, and a second transceiver, wherein said first processor is configured to:
   a) retrieve a first BLUETOOTH® device identifier used for identifying said first computing device;
   b) convert the first BLUETOOTH® device identifier into a second BLUETOOTH® device identifier;
   c) advertise availability of said first computing device using the second BLUETOOTH® device identifier;
   d) receive a pairing request from said second computing device;
   e) establish a BLUETOOTH® communications path between said first computing device and said second computing device in response to the pairing request, wherein said BLUETOOTH® communications path is created based at least partially on the second BLUETOOTH® device identifier;
   f.) provide the first BLUETOOTH® device identifier to the second computing device using the BLUETOOTH® communications path, the first BLUETOOTH® device identifier being a substitute for the second BLUETOOTH® device identifier; and g) update said BLUETOOTH® communications path between said first computing device and said second computing device based on said first BLUETOOTH® device identifier.

9. The system of claim 8, wherein said first processor is further configured to:
communicate data with said second computing device using said updated BLUETOOTH® communications path based on the first BLUETOOTH® device identifier.

10. The system of claim 8, wherein said first processor is further configured to:
partition the first BLUETOOTH® device identifier into a first portion and a second portion;
identify a "pseudo" organizationally unique identifier; and
replace the first portion of the first BLUETOOTH® device identifier with the "pseudo" organizationally unique identifier.

11. The system of claim 10, wherein said first processor is further configured to identify the "pseudo" organizationally unique identifier from a data store in communication with said first computing device.

12. The system of claim 8, wherein said first processor is further configured to:
partition the first BLUETOOTH® device identifier into a first portion and a second portion;
identify a "pseudo" device specific identifier; and
replace the second portion of the first BLUETOOTH® device identifier with the "pseudo" device specific identifier.

13. The system of claim 12, wherein said first processor is further configured to identify the "pseudo" device specific identifier by using at least one of a random number generator, a conversion algorithm, and a data store in communication with said first computing device.

14. The system of claim 8, wherein said first processor is further configured to:
a) retrieve the first BLUETOOTH® device identifier used for identifying said first computing device;
b) convert the first BLUETOOTH® device identifier into a third BLUETOOTH® device identifier, wherein the third BLUETOOTH® device identifier is distinct from the second BLUETOOTH® device identifier and the first BLUETOOTH® device identifier;
c) advertise availability of said first computing device using the third BLUETOOTH® device identifier;
d) receive a pairing request from a third computing device;
e) establish a BLUETOOTH® communications path between said first computing device and said third computing device in response to the pairing request, wherein said BLUETOOTH® communications path is created based at least partially on the third BLUETOOTH® device identifier;
f) provide the first BLUETOOTH® device identifier to the third computing device using the BLUETOOTH® communications path, the first BLUETOOTH® device identifier being a substitute for the third BLUETOOTH® device identifier; and
g) update said BLUETOOTH® communications path between said first computing device and said third computing device based on the first BLUETOOTH® device identifier after the first BLUETOOTH® device identifier is provided to the third computing device.

15. A BLUETOOTH® enabled computing device for improved BLUETOOTH® pairing, said computing device comprising:
a processor, a memory, and a transceiver, said processor configured to:
a) retrieve a first BLUETOOTH® device identifier used for identifying said computing device;
b) convert the first BLUETOOTH® device identifier into a second BLUETOOTH® device identifier;
c) advertise availability of said computing device using the second BLUETOOTH® device identifier;
d) receive a pairing request from a second computing device;
e) establish a BLUETOOTH® communications path between said computing device and said second computing device in response to the pairing request, wherein said BLUETOOTH® communications path is created based at least partially on the second BLUETOOTH® device identifier;
f) provide the first BLUETOOTH® device identifier to the second computing device using the BLUETOOTH® communications path, the first BLUETOOTH® device identifier being a substitute for the second BLUETOOTH® device identifier; and
g) update said BLUETOOTH® communications path between said computing device and said second computing device based on said first BLUETOOTH® device identifier after the first BLUETOOTH® device identifier is provided to the second computing device.

16. The BLUETOOTH® enabled computing device of claim 15, wherein said processor is further configured to:
communicate data with said second computing device using said updated BLUETOOTH® communications path based on the first BLUETOOTH® device identifier.

17. The BLUETOOTH® enabled computing device of claim 15, wherein said processor is further configured to:
partition the first BLUETOOTH® device identifier into a first portion and a second portion;
identify a "pseudo" organizationally unique identifier; and
replace the first portion of the first BLUETOOTH® device identifier with the "pseudo" organizationally unique identifier.

18. The BLUETOOTH® enabled computing device of claim 17, wherein said processor is further configured to identify the "pseudo" organizationally unique identifier from a data store in communication with said computing device.

19. The BLUETOOTH® enabled computing device of claim 15, wherein said processor is further configured to:
partition the first BLUETOOTH® device identifier into a first portion and a second portion;
identify a "pseudo" device specific identifier; and replace the second portion of the first BLUETOOTH® device identifier with the "pseudo" device specific identifier.

20. The BLUETOOTH® enabled computing device of claim 19, wherein said processor is further configured to identify the "pseudo" device specific identifier by using at least one of a random number generator, a conversion algorithm, and a data store in communication with said first computing device.

21. The BLUETOOTH® enabled computing device of claim 15, wherein said processor is further configured to:
a) retrieve the first BLUETOOTH® device identifier used for identifying said computing device;

b) convert the first BLUETOOTH® device identifier into a third BLUETOOTH® device identifier, wherein the third BLUETOOTH® device identifier is distinct from the second BLUETOOTH® device identifier and the first BLUETOOTH® device identifier;
c) advertise availability of said computing device using the third BLUETOOTH® device identifier;
d) receive a pairing request from a third computing device;
e) establish a BLUETOOTH® communications path between said computing device and said third computing device in response to the pairing request, wherein said BLUETOOTH® communications path is created based at least partially on the third BLUETOOTH® device identifier;
f) provide the first BLUETOOTH® device identifier to the third computing device using the BLUETOOTH® communications path, the first BLUETOOTH® device identifier being a substitute for the third BLUETOOTH® device identifier; and
g) update said BLUETOOTH® communications path between said computing device and said third computing device based on the first BLUETOOTH® device identifier after the first BLUETOOTH® device identifier is provided to the third computing device.

* * * * *